UNITED STATES PATENT OFFICE.

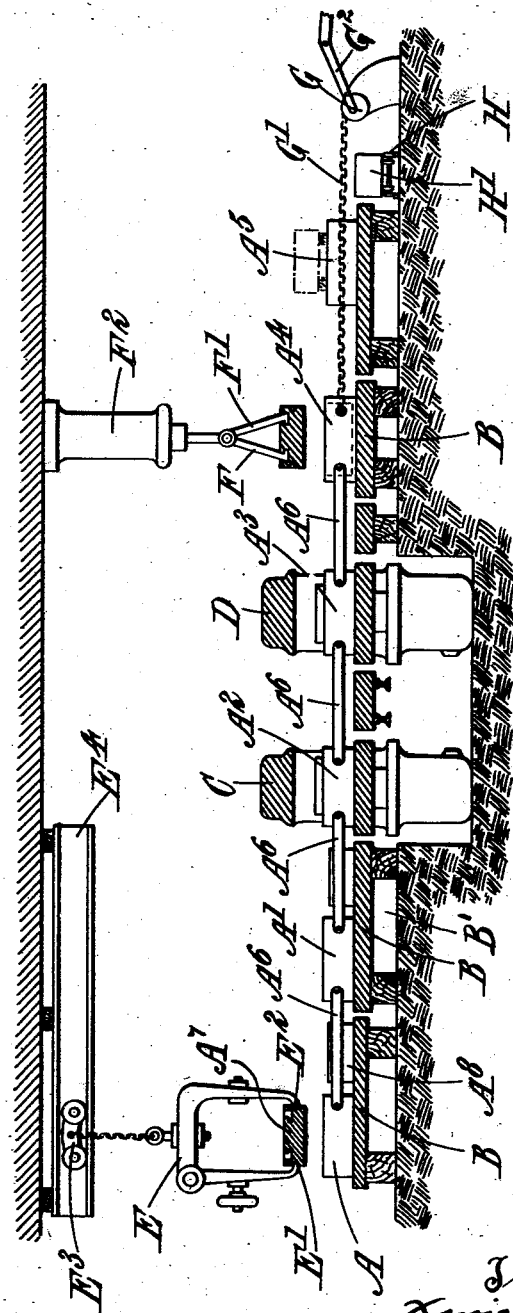

XAVIER GOSSELIN, OF HARPENDEN, ENGLAND, ASSIGNOR TO MILLWALL RUBBER COMPANY LIMITED, OF WHITE CITY, HARPENDEN, ENGLAND.

APPARATUS FOR TREATING RUBBER COMPOUNDS AND THE LIKE.

1,009,504.  Specification of Letters Patent.  Patented Nov. 21, 1911.

Application filed October 8, 1910. Serial No. 586,023.

*To all whom it may concern:*

Be it known that I, XAVIER GOSSELIN, a citizen of the French Republic, and a resident of Harpenden, in Hertfordshire, England, have invented certain new and useful Improvements in Apparatus for Treating Rubber Compounds and the Like, of which the following is a specification.

This invention relates to improvements in apparatus for treating rubber compounds and refers particularly to apparatus for treating powdered vulcanized substances or waste rubber compounds.

Apparatus according to this invention comprises in combination means for applying heat and pressure to the contents of a series of molds and means for moving said molds so that they all pass through the same cycle of operations and so that each element of the cycle may be continually operative.

In a preferred construction the apparatus is so arranged that as each mold is moved its contents will be (a) introduced into a mold and heated before or after introduction, (b) subjected to pressure while heat is maintained, (c) allowed to cool while still under pressure, (d) allowed to cool with pressure removed, (e) discharged from the molds.

According to one modification the apparatus comprises a series of molds connected together and movable over a series of platforms and means for charging and discharging molds, heating and cooling them, lifting on and off the lids, and subjecting the molds to heat under pressure and to pressure without heat.

One method of carrying this invention into effect will be described with reference to the accompanying drawing which represents diagrammatically the apparatus employed.

Molds A A¹ A² A³ A⁴ A⁵ are supported on a series of platforms B and are connected together by means of the connectors A⁶. A press C is adapted to receive a mold A and to exert a pressure on the contents thereof at the same time maintaining it in a heated condition. The press D is adapted to maintain the pressure upon the contents of the mold but allows or causes the mold and its contents to cool by refrigerating means.

An adjustable claw-like member E having two arms terminating in points E¹ E² is supported by the carrier E³ running on an overhead track E⁴. When the claw E is lowered the points E¹ E² are adapted to engage with two conical holes in the sides of the cover A⁷ so that the cover may be rotated about the suspension points E¹ and E² to facilitate cleaning operations. A second claw-like member F F¹ is operated by means of the hydraulic press F². Both the claw-like members are adapted to remove the covers of the molds as will be more particularly described hereinafter.

A winch G is connected to the mold A⁴ by means of the chain, rope or other connector G¹.

At the end of the series of platforms B are track rails H upon which runs a truck or the like H¹ which is adapted to receive the last mold such as A⁵ and to convey it back to the other end of the series of molds.

The material is charged into the molds by hand.

The action and operation of the apparatus is as follows:—Assuming the mold A⁵ and its contents have undergone the treatment which is now about to be described, it is removed to the truck H¹ and conveyed to the position of the mold A. The mold is then discharged and after the cover has been cleaned the latter is placed in front of the mold as illustrated and denoted by the reference letter A⁸. The winch G is then operated conveniently by the crank handle G² to draw the molds toward it so that the mold A, pushing its cover before it is moved to the position A¹ where the material is supplied to it conveniently by hand and while remaining in this position the mold is resting on a platform B which is maintained in a heated condition, by a heating device B¹. The next movement of the winch brings the mold to the position A² where it is acted upon by the press C, so that the contents of the mold are subjected to pressure while being maintained at a vulcanizing temperature. Following the treatment in the press C the mold is next moved to the press D where the pressure is still maintained but the mold is allowed or caused to cool. Conveniently, with further movement of the winch G, the mold is moved into the position A⁴ where the claw F F¹ is operated by the hydraulic ram F² to engage with the cover of the mold and pull or tear it therefrom. Before replacing the cover on the mold, distance pieces are placed upon the molds so that the cover remains raised as illustrated at A⁵. The connector G¹ is then removed from the mold at A⁵ and connected to the mold A⁴ as illustrated. The mold A⁵ is now transferred to the truck H¹ whence it is removed to the position A and the foregoing cycle of operations is recommenced. It is to be noticed that the period of rest in each position of the mold is the same. If necessary the heating period can be increased by the use of one or more supplementary heating platforms.

Obviously various modifications may be made in carrying the invention into effect. For example, in place of the employment of platforms, such as B, a form of guide track-rail could be employed and for heating the mold A¹ it could be drawn through an open-ended oven or similar heating apparatus.

Other modifications may be made, provided always that the spirit of the invention is not departed from.

What I claim as my invention and desire to secure by Letters Patent is:—

1. Apparatus for treating powdered vulcanized substances comprising in combination a plurality of molds, connectors between each adjacent mold, an intermittently moving winch, a connector between said winch and the end mold of the series, platforms supporting the molds, a press maintained at a vulcanizing temperature, a cooling press, covers for each mold, adjustable jaws which grip the covers to remove or replace them, and a carriage on which the end mold of the series may be placed after completing the process.

2. Apparatus for treating powdered vulcanized substances comprising in combination a plurality of molds, connectors between each adjacent mold, an intermittently moving winch, a connector between said winch and the end mold of the series, platforms supporting the molds, a press maintained at a vulcanizing temperature, a cooling press, covers for the molds, adjustable jaws which grip the covers to remove or replace them, a movable traveler supporting the jaws, and a carriage on which the end mold of the series may be placed after completing the process.

3. Apparatus for treating powdered vulcanized substances comprising in combination a plurality of molds, connectors between each adjacent mold, an intermittently moving winch, a connector between said winch and the end mold of the series, platforms supporting the molds, a press maintained at a vulcanizing temperature, a cooling press, a cover for each mold, adjustable jaws being pointed at their gripping portions, the covers having cavities adapted to receive the points of the jaws, and a carriage on which the end mold of the series may be placed after completing the process.

4. Apparatus for treating powdered vulcanized substances comprising in combination a plurality of molds, connectors between each adjacent mold, an intermittently moving winch, a connector between said winch and the end mold of the series, platforms supporting the molds, a press maintained at a vulcanizing temperature, a cooling press, a cover for each mold, adjustable jaws being pointed at their gripping portions, the covers having cavities adapted to receive the points of the jaws and a movable traveler supporting the jaws, and a carriage on which the end mold of the series may be placed after completing the process.

5. Apparatus for treating powdered vulcanized substances comprising in combination a plurality of molds, connectors between each adjacent mold, an intermittently moving winch, a connector between said winch and the end mold of the series, platforms supporting the molds, a press maintained at a vulcanizing temperature, a cooling press, a cover for each mold, adjustable jaws being pointed at their gripping portions, the covers having cavities adapted to receive the points of the jaws and a movable traveler supporting the jaws, other jaws for removing the mold covers after the contents have been compressed, and a carriage on which the end mold of the series may be placed after completing the process.

In testimony whereof I have signed my name to this specification in the presence of two subscribing witnesses.

XAVIER GOSSELIN.

Witnesses:
WILLIAM H. BALLANTYNE,
HARRY B. BRIDGE.